May 20, 1969 R. R. ECKENBRECHT ET AL 3,445,717

BRIGHTNESS SIGNAL LIMITING AND FAULTY COMPONENT INDICATING CIRCUITRY FOR CATHODE RAY TUBE SYSTEM

Filed Jan. 17, 1968

INVENTORS
ROBERT R. ECKENBRECHT,
DONG W. RHEE

BY Cyril A. Krenzer
ATTORNEY

United States Patent Office 3,445,717

Patented May 20, 1969

3,445,717

BRIGHTNESS SIGNAL LIMITING AND FAULTY COMPONENT INDICATING CIRCUITRY FOR CATHODE RAY TUBE SYSTEM

Robert Roy Eckenbrecht, East Bethany, and Dong W. Rhee, Williamsville, N.Y., assignors to Sylvania Electric Products Inc., a corporation of Delaware Filed Jan. 17, 1968, Ser. No. 698,580

Int. Cl. H01j *29/70, 29/52*

U.S. Cl. 315—22 6 Claims

ABSTRACT OF THE DISCLOSURE

In a cathode ray tube system having a cathode ray tube with a beam intensity electrode coupled to a signal brightness amplification means and a high voltage electrode coupled to a source of high voltage potential, a brightness signal limiting and faulty component indicating circuit includes a shunt regulating means in the form of a shunt regulating tube and unidirectional conduction device series connected intermediate the high voltage potential source and a voltage reference level and a bias developing means in the form of an electron device coupling the signal brightness amplification means to a voltage reference level and to the shunt regulating means.

Background of the invention

In cathode ray tube systems and particularly color television receivers employing cathode ray tubes requiring a source of high voltage potential, it is an accepted practice to provide some means for regulating the high voltage source. Usually, the high voltage source is shunted by a shunt regulating tube whereby any tendency for an increase in high voltage potential applied to the cathode ray tube is opposed by increased conduction of the shunt regulating tube. In this manner, a reasonably constant value of high voltage potential is maintained at the high voltage electrode of the cathode ray tube.

While such systems have received widespread acceptance, it has been found that there are certain operational conditions whereat such systems leave something to be desired. Also, it has been found that component failure, such as an "open-circuited" shunt regulator tube for instance, not only permits the application of undesired excessive high voltage potential to the high voltage electrode of the cathode ray tube, but also provides little or no indication to the viewer that a component defect has occurred.

More specifically, it has been found that a relatively strong signal often tends to cause an undesired excessive increase in the video signal, representative of brightness, applied to the beam intensity electrode of the cathode ray tube. In turn, the electron beam current tends to undesirably increase to an excessive value causing an undesired bright spot on the viewing screen of the cathode ray tube which is usually referred to as "blooming."

Also, it has been found that the scene observed by a viewer of a color television receiver is only minutely affected by failure of one or more components in the receiver, such as the shunt regulator tube, for instance. Moreover, detection of such an image shift requires an observer having a skill much greater than that of the average viewer. Thus, the lack of a clear visual indication of a component failure permits continued operation of the color television receiver under adverse operational conditions.

Objects and summary of the invention

Therefore, it is an object of the invention to provide an enhanced cathode ray tube system. Another object of the invention is to provide an improved brightness signal limiting circuit for a color television receiver. Still another object of the invention is to provide an improved faulty component indicating circuit for a color television receiver.

These and other objects are achieved in one aspect of the invention by a brightness signal limiting and faulty component indicating circuit which includes a shunt regulating means having a shunt regulator tube and unidirectional conduction device series connecting a high voltage source to a voltage reference level and a bias developing means including an electron device coupling a brightness signal amplification means to a voltage reference level and to the shunt regulating means whereby an increased video signal representative of increased brightness is accompanied by an increase in bias potential applied to the brightness signal amplification means, limiting the signal applied to the cathode ray tube. Also, a viewed scene on a cathode ray tube is removed or cut off in the event of a component failure whereby corrective action is indicated to the viewer.

Description of the preferred embodiments

In order to better understand the present invention, together with other and further advantages and capabilities thereof, reference is made to the accompanying drawings and appended claims in conjunction with the following disclosure discussed in the atmosphere of a color television receiver for purposes of clarity and brevity.

Figure 1:
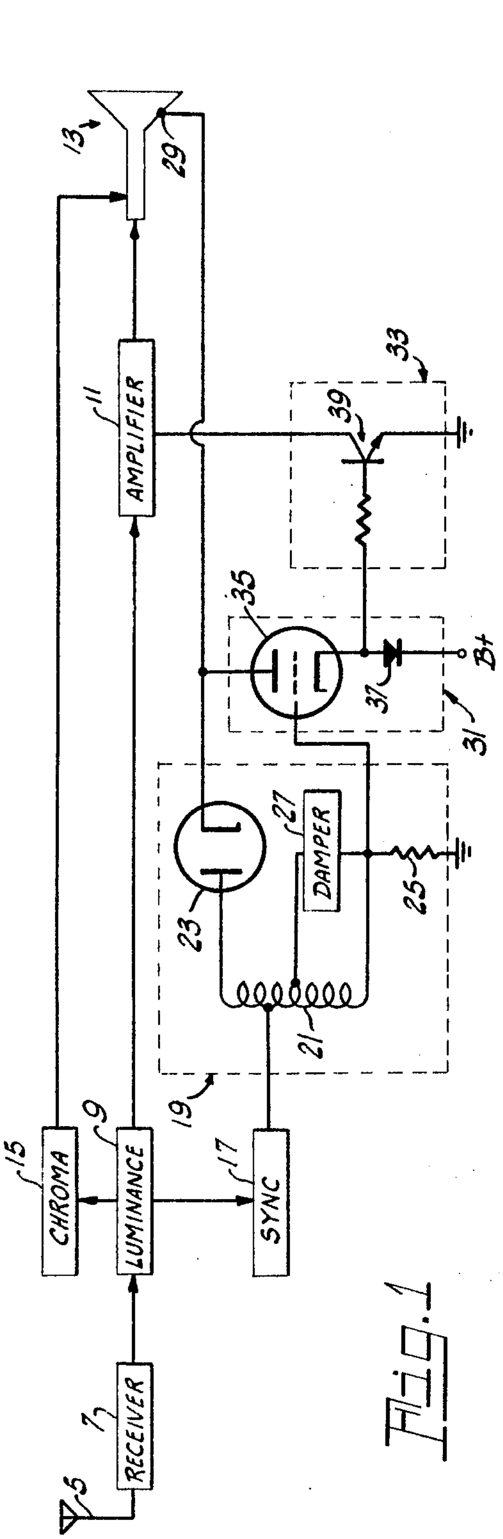
FIG. 1 is a partial block and schematic illustration of a color television receiver employing one embodiment of the invention.

Referring to the drawings, FIG. 1 illustrates a cathode ray tube system in the form of a partial block and schematic diagram of a color television receiver. The color television receiver includes the usual antenna 5 for intercepting transmitted color signals and applying these intercepted signals to a signal receiver 7. In a well known manner, the signal receiver processes the intercepted signals by way of the usual radio frequency (RF) and intermediate frequency (IF) amplifiers and detectors to provide a composite color signal which is applied to a luminance channel 9.

The luminance channel 9 includes the normal delay line and amplification stages and provides a luminance singal representative of the brightness of a viewed image. This luminance signal is applied via a brightness signal amplification stage 11 to a beam intensity electrode of the color cathode ray tube 13. Thus, the beam intensity of the cathode ray tube 13 is dependent upon the magnitude of luminance signal representing viewed image brightness and, more directly, the operation of the brightness signal amplification stage 11.

Also, a composite color signal from the luminance channel 9 is applied to a chrominance channel 15. The chrominance channel 15 includes the necessary bandpass, gating, demodulation and color signal amplification stages whereby the color signals are separated from the composite color signals and applied to the color cathode ray tube 13. Thus, the color cathode ray tube 13 receives signals representative of both brightness and color of a viewed image.

Further, the luminance channel 9 provides a composite color signal which is applied to a synchronizing channel 17. Therein, synchronizing pulse signals are separated from the composite color signal and applied to horizontal and vertical deflection circuitry and, in turn, to horizontal and vertical deflection apparatus associated with the color cathode ray tube 13 to provide the usual scanning capability of the electron beam. Also, the synchronizing channel 17 includes a means for generating a current which is applied to a high voltage rectifier means 19.

The high voltage rectifier means 19 includes an autotransformer-type winding 21 having one terminal connected to a rectifier 23 and the other terminal coupled via a resistor 25 to a voltage reference level such as circuit ground. The winding 21 has a portion thereof shunted by a damper stage 27, in a manner well known in the art, and the rectifier 23 provides a high voltage DC potential which is applied to the high voltage electrode 29 of the color cathode ray tube 13.

Essentially, the above-described circuitry and apparatus are common to most present-day color television receivers. However, in order to insure a reasonably constant level of high voltage potential at the high voltage electrode 29 of the cathode ray tube 13, limit the magnitude of the electron beam current therein, and indicate to the viewer the occurrence of a component failure, there is provided brightness signal limiting and faulty component indicating circuitry.

The brightness limiting and faulty component indicating circuitry includes a shunt regulating means 31 coupling the high voltage rectifier means 19 to a voltage reference level B+ and a bias developing means 33 coupling the brightness signal amplification stage 11 to a voltage reference level, circuit ground for instance, and to the shunt regulating means 31. More specifically, the shunt regulating means 31 includes a shunt regulator tube 35 coupled to the junction of the high voltage rectifier means 19 and the high voltage electrode 29 of the cathode ray tube 13 and by way of a series connected unidirectional conduction device 37 to a voltage reference level such as B+ for instance. Also, the bias developing means 33 includes an electron device 39 having input and output electrodes coupling the brightness signal amplification stage 11 to a voltage reference level and a control electrode coupled to the shunt regulating means 31.

As to the operation of the brightness limiting and faulty component indicating circuitry, it can be readily seen that an excessive brightness signal will cause an excessive increase in the intensity of the electron beam of the cathode ray tube 13. Thereupon, the potential available at the high voltage electrode 29 will decrease reducing the shunting action of the shunt regulating means 31. The potential at the junction of the series connected shunt regulator tube 35 and unidirectional conduction device 37, which is applied to the control electrode of the electron device 39 of the bias developing means 33, will be increased whereupon the bias potential applied to the brightness signal amplifier stage 11 is increased reducing the signal amplification capability thereof. Thus, the magnitude of the excessive brightness signal is limited by the combined action of the shunt regulating means 31, the bias developing means 33, and the brightness signal amplification stage 11.

Further, a component failure such as an "open circuited" shunt regulator tube 35 for instance, would tend to cause a reversal in current flow through the unidirectional conduction device 37, whereupon the unidirectional conduction device 37 becomes, in essence, an open circuit removing the voltage reference level B+. Thereupon, the bias potential applied to the bias developing means 33 is increased which, in turn, increases the potential and biasing of the brightness signal amplification stage 11. This brightness signal amplification stage 11 is thus driven to a cut-off condition eleminating the signal applied to the cathode ray tube 13 and the electron beam current therein whereupon the viewer is made immediately aware of a component failure.

Figure 2:
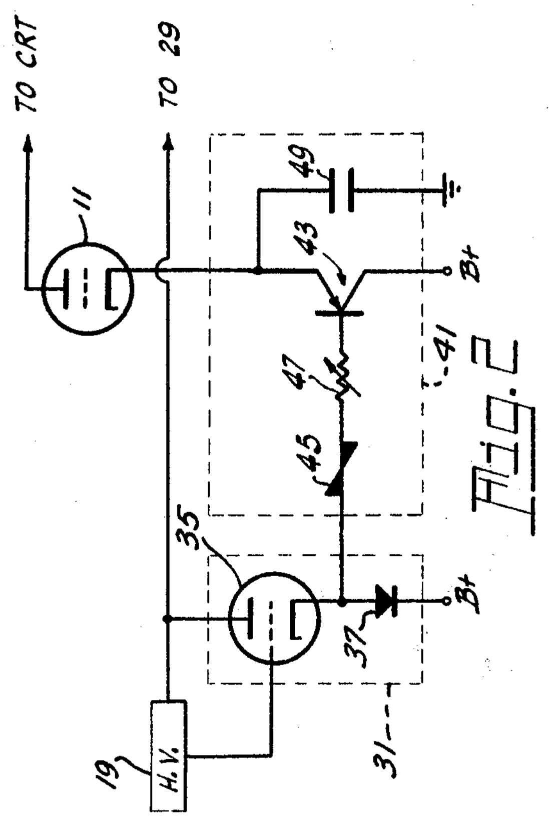
FIG. 2 is an alternate embodiment of a brightness signal limiting and faulty indicating circuit.

Alternatively, FIG. 2 utilizes similar numbers for similar components to illustrate another embodiment of a brightness limiting and faulty component indicating circuit. Herein, a high voltage rectifier means 19 is coupled to the high voltage electrode 29 of a cathode ray tube 13. A shunt regulating means 31 including a series connected shunt regulator tube 35 and unidirectional conduction device 37 couple the high voltage rectifier means 19 to a voltage reference level B+. A bias developing means 41 couples the brightness signal amplification stage 11 to the shunt regulating means 31 and to a voltage reference level B+.

The bias developing means 41 includes an electron device 43 having an input electrode coupled to the brightness signal amplification stage 11 and an output electrode coupled to the voltage reference level B+. The control electrode of the electron device 43 is coupled by way of a series connected voltage dependent resistor 45 and alterable resistor 47 to the shunt regulating means 31. Also, a capacitor means 49 couples the input electrode to a voltage reference level such as circuit ground.

Figure 3:
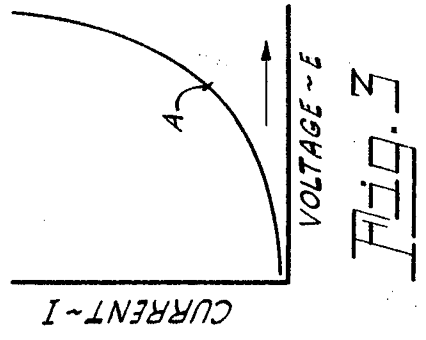
FIG. 3 is an operational curve indicating the current voltage relationship of the voltage dependent resistor of the embodiments of FIG. 2.

The voltage dependent resistor 45, having an operational curve substantially as illustrated in FIG. 3, is selected such that operational point A occurs on the "knee" thereof. Also, the alterable resistor 47 is adjusted such that the electron device 43 is near the point of maximum current flow or saturation. Thus, a shift in either direction of the potential applied to the voltage dependent resistor 45 is emphasized to provide an increased effect upon the brightness limiting capability of the system.

Further, the storage capabilities of the capacitive means 49 serves to prevent a momentary loss of signal from deleteriously affecting the scene of the cathode ray tube as observed by the viewer. Also, the capacitive means 49 serves to prevent degeneration of an average signal due to the coupling thereof to circuit ground.

In operation, the embodiment of FIG. 2 is substantially similar to the above-described operation of the embodiment of FIG. 1. However, the voltage dependent resistor 45 and alterable resistor 47 serve to emphasize the brightness limiting capability of the system without deleterious effect upon the faulty component indicating capability thereof. Moreover, the capacitive means 49 prevents the viewer from observing any undesired momentary interruption of televised signals.

Thus, there has been provided an enhanced cathode ray tube system which includes an improved brightness limiting and faulty component indicating circuit. Not only does the circuitry inhibit undesired brightness or "blooming" but also provides the viewer with a positive indication of a component failure. Thus, the viewer is provided with the opportunity of preventing continuous operation of the cathode ray tube system under adverse conditions of operation due to faulty apparatus.

While there have been shown and described what are at present considered the preferred embodiments of the invention, it will be obvious to those skilled in the art that various changes and modifications may be made therein without departing from the scope of the invention as defined by the appended claims.

We claim:

1. In a cathode ray tube system including a cathode ray tube having beam intensity and high voltage electrodes, signal brightness amplification means coupled to the beam intensity electrode, and rectifier means for developing and applying a high voltage potential to the high voltage electrode, brightness signal limiting and faulty component indicating circuitry comprising in combination:

shunt regulating means coupling said rectifier means to a voltage reference level, said means including a series connected shunt regulating tube and unidirectional conduction device; and bias developing means coupling said shunt regulating means to said signal brightness amplification means, said bias developing means including an electron device having input and output electrodes coupling said signal brightness amplification means to a voltage reference level and a control electrode coupled to said shunt regulating means.

2. The brightness limiting and faulty component indicating circuitry of claim 1 wherein said electron device is in the form of a transistor.

3. The brightness limiting and faulty component indicating circuitry of claim 1 including an alterable impedance coupling said control electrode of said electron device to said shunt regulating means.

4. The brightness limiting and faulty component indicating circuitry of claim 3 wherein said alterable impedance is in the form of a series connected voltage dependent resistor and an adjustable resistor.

5. The brightness limiting and faulty component indicating circuitry of claim 1 including an impedance shunting said electron device.

6. The brightness limiting and faulty component indicating circuitry of claim 5 wherein said impedance is in the form of a capacitor means shunting said electron device.

References Cited

UNITED STATES PATENTS

| | | | |
|---|---|---|---|
| 2,559,078 | 7/1951 | Kell | 315—30 X |
| 2,701,850 | 2/1955 | Blayney | 315—31 X |

RODNEY D. BENNETT, Jr., *Primary Examiner.*

MALCOLM F. HUBLER, *Assistant Examiner.*

U.S. Cl. X.R.

315—30